US011024136B2

(12) United States Patent
Lee

(10) Patent No.: US 11,024,136 B2
(45) Date of Patent: Jun. 1, 2021

(54) METHOD AND APPARATUS FOR REMOTE SURVEILLANCE

(71) Applicant: George Lee, Los Altos, CA (US)

(72) Inventor: George Lee, Los Altos, CA (US)

(73) Assignee: TECHCAM, LLC, Los Altos, CA (US)

(*) Notice: Subject to any disclaimer, the term of this patent is extended or adjusted under 35 U.S.C. 154(b) by 203 days.

(21) Appl. No.: 15/090,003

(22) Filed: Apr. 4, 2016

(65) Prior Publication Data

US 2016/0358435 A1    Dec. 8, 2016

Related U.S. Application Data

(60) Provisional application No. 62/141,909, filed on Apr. 2, 2015.

(51) Int. Cl.
*G08B 13/196* (2006.01)
*H04N 7/18* (2006.01)
*H04N 5/232* (2006.01)

(52) U.S. Cl.
CPC ... *G08B 13/19632* (2013.01); *G08B 13/1963* (2013.01); *H04N 5/23206* (2013.01); *H04N 7/183* (2013.01); *H04N 5/23299* (2018.08)

(58) Field of Classification Search
CPC .......... G08B 13/1963; G08B 13/19632; H04N 5/23206; H04N 7/183
See application file for complete search history.

(56) References Cited

U.S. PATENT DOCUMENTS

| | | | |
|---|---|---|---|
| 6,175,650 B1* | 1/2001 | Sindhu | G06T 9/005 358/453 |
| 2003/0043279 A1* | 3/2003 | Alardin | H04N 7/185 348/211.3 |
| 2004/0083290 A1* | 4/2004 | Chen | H04L 29/12009 709/227 |
| 2007/0285270 A1* | 12/2007 | Gunn | G08B 25/08 340/693.6 |
| 2007/0287389 A1* | 12/2007 | Pockat | H04B 1/03 455/73 |
| 2008/0037631 A1* | 2/2008 | Hong | H04N 19/159 375/240.03 |
| 2009/0189981 A1* | 7/2009 | Siann | H04N 7/183 348/143 |
| 2009/0244279 A1* | 10/2009 | Walsh | G08B 13/19636 348/143 |
| 2010/0125902 A1* | 5/2010 | Killian | H04L 63/0272 726/15 |
| 2013/0182712 A1* | 7/2013 | Aguayo | H04L 12/4633 370/395.53 |
| 2014/0344449 A1* | 11/2014 | Callan | H04L 61/2038 709/224 |

(Continued)

*Primary Examiner* — Jessica M Prince
(74) *Attorney, Agent, or Firm* — Amardeep S. Grewal; Reed Smith LLP

(57) ABSTRACT

A remote surveillance apparatus and method comprising a camera movably coupled to a mast and configured to capture video data and transmit the captured video data, a router configured to receive the captured video data and wirelessly retransmit the captured video data, via a modem, to a user computing device in response to a request from the user computing device, and an enclosure coupled to the mast and housing the router and the modem.

18 Claims, 14 Drawing Sheets

(56) References Cited

U.S. PATENT DOCUMENTS

| | | | |
|---|---|---|---|
| 2015/0161860 A1* | 6/2015 | Pringle | G08B 13/19632 348/143 |
| 2016/0026192 A1* | 1/2016 | Phillips | G06K 9/3258 348/143 |
| 2016/0119278 A1* | 4/2016 | Madan | H04L 61/2046 709/245 |
| 2016/0269353 A1* | 9/2016 | Chan | H04L 61/2053 |
| 2016/0286001 A1* | 9/2016 | Chan | H04L 12/6418 |

* cited by examiner

METHOD AND APPARATUS FOR REMOTE SURVEILLANCE

RELATED APPLICATION DATA

This application claims priority to U.S. Provisional Application No. 62/141,909, filed Apr. 2, 2015, the disclosure of which is hereby incorporated by reference in its entirety.

BACKGROUND

There are limited options for remote surveillance for a worksite, such as a construction site. One surveillance option is to use an Internet Protocol (IP) Closed Circuit Television (CCTV) surveillance camera. However, traditional IP CCTV surveillance camera systems are non-portable, permanent installations which take a long time to install and are fixed to a particular location. In the situation where a construction project rapidly progresses to different location or in which the camera is only required for a short duration, such an installation is expensive and inefficient.

Another surveillance option is to use wireless devices such as smartphones, which can transmit data over a cellular connection. However, wireless devices such as smartphones are typically not weatherproof or designed for continuous operation. Additionally, many cellular devices utilize private IP addresses, which allow the devices to request data from other sources over the cellular connection, but do not allow for a remote device to address requests to the cellular device (since the IP address is not public). In this situation, it would be difficult for a user to remotely access the video data being captured by the wireless device.

DETAILED DESCRIPTION

While methods, apparatuses, and computer-readable media are described herein by way of examples and embodiments, those skilled in the art recognize that methods, apparatuses, and computer-readable media for operating a remote surveillance apparatus are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicant has discovered and developed a new remote surveillance apparatus and associated process to allow users to conduct remote surveillance of a location without requiring permanent installation of surveillance equipment. The remote surveillance apparatus is mobile and includes protective components which enable deployment at a variety of locations, such as construction worksites. Additionally, Applicant has discovered and developed a new apparatus and process which enables users to directly access the remote surveillance apparatus from a user computing device.

Figure 1:
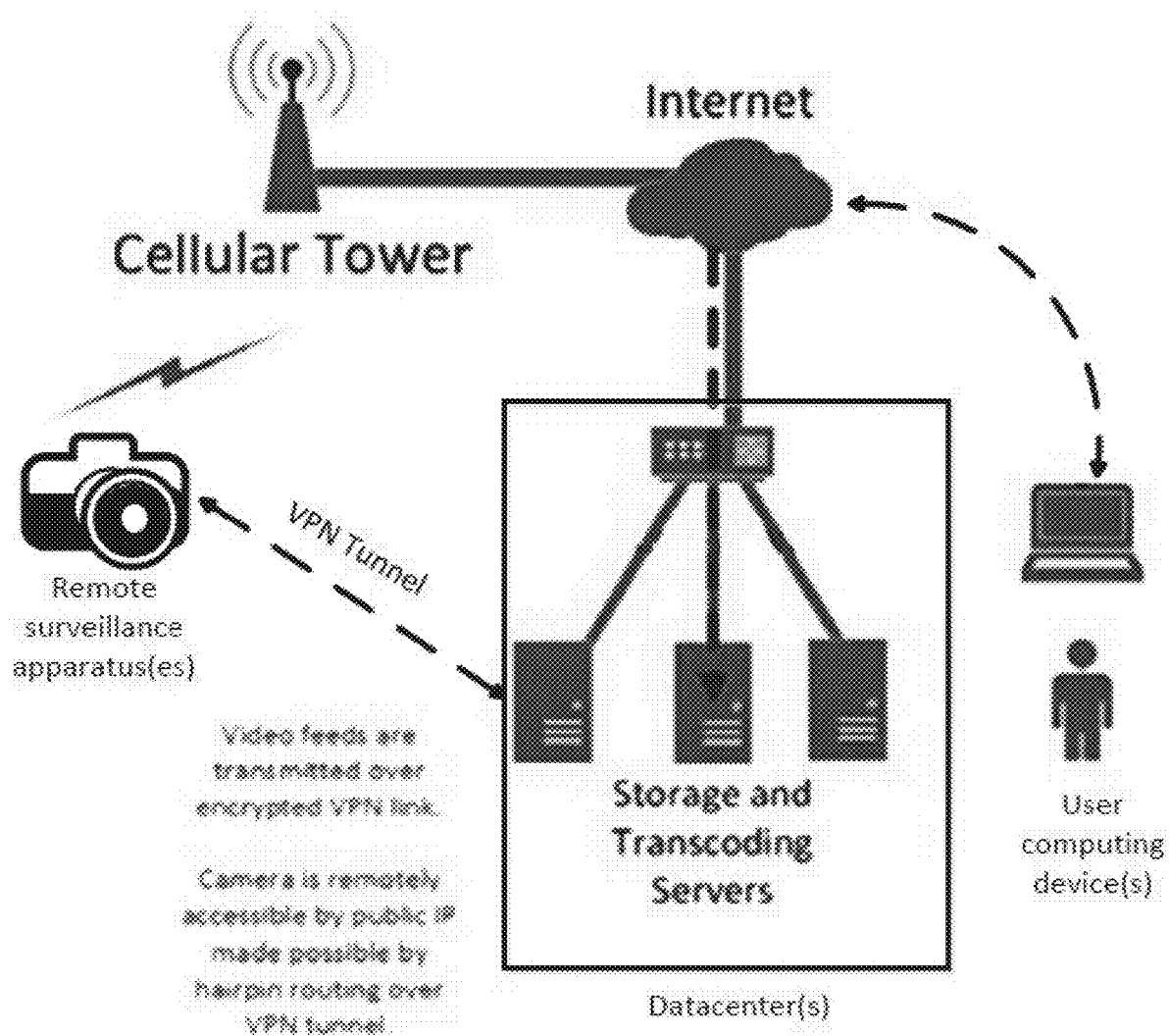
FIG. 1 illustrates a system for utilizing a remote surveillance apparatus according to an exemplary embodiment.

FIG. 1 illustrates a system for utilizing a remote surveillance apparatus according to an exemplary embodiment. As shown in FIG. 1, the system includes one or more remote observation apparatuses, one or more datacenters (where each datacenter can include multiple computing devices) and one or more user computing devices.

The system is configured to transmit video from the remote observation apparatus over a network, such as the Internet, to the one or more datacenters, and then on to the one or more user computing devices. As will be discussed further with respect to the apparatus, the video data captured by the remote surveillance apparatus can be transmitted to a datacenter over a virtual private network (VPN).

Each datacenter can include one or more servers, which store and transcode the video(s). Each server can sort and/or store the videos received on an hourly basis and can include an image repository.

The one or more user computing devices are configured to communicate with the one or more datacenters through a network, such as the internet. Individuals can view or access the videos (or portions thereof or select ones of the videos) via the user computing device(s). The system is not limited to use with one particular type of user computing device. For example, a user computing device can be a smartphone, a tablet, a laptop, a desktop, a vehicle's center console, body wearables such as watches and glasses, and the like.

The video(s) can be streamed live, or can be recorded for real-time playback and/or time lapse viewing. In particular, the video streaming can be transcoded for live playback, transcoded for historical replay, on-the-fly time-lapse, and/or server side pre-complied time-lapse. Additionally, the video data can include one or more images captured by the remote observation apparatus.

Figure 2:
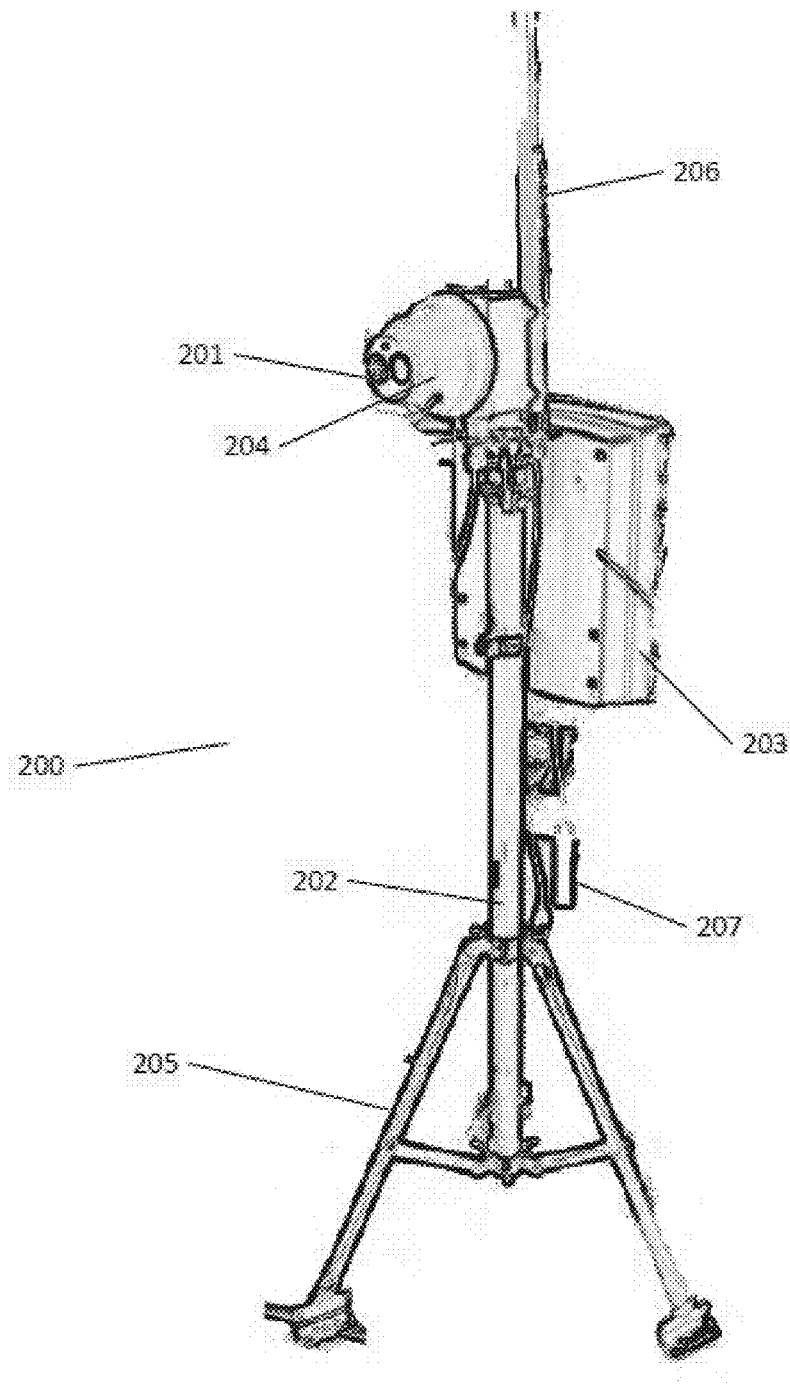
FIG. 2 is a perspective view of the remote surveillance apparatus according to an exemplary embodiment.

FIG. 2 is a perspective view of the remote surveillance apparatus 200 according to an exemplary embodiment. The apparatus 200 can be located or positioned at any site in which it is desirable to periodically or constantly monitor or view, such as at a construction site or the exterior of a home. The apparatus 200 its can components can be waterproof or water-resistant.

The apparatus 200 includes a camera 204 movably coupled to a mast 202 and configured to capture video data and transmit the captured video data. The camera 204 can be a high-definition, internet protocol, and/or closed-circuit television camera. The camera 204 can employ or utilize Real Time Streaming Protocol (RTSP). The camera 204 can take timer-based snapshots and/or motion-based snapshots. Two or more cameras 204 can be mounted to a single mast 202, if desired.

The apparatus 200 can further include a base 205, shown as a tripod. Of course the base 205 can include other structures for stabilizing the mast 202, such as a heavy disc, geometric shape, or weight coupled to the mast 202.

The camera 204 can rotate with respect to the mast 202, such that the camera 204 can capture video in 360 degrees. The camera 204 can include an infrared, night vision light emitting diode (LED) 201. Additionally, the camera 204 is configured to be able to tilt, pan, and zoom. The mast 202 can be military-grade telescopic mast which allows the camera 204 to be selectively raised and lowered (i.e., adjustable height) with respect to the ground or other mounting surface.

The apparatus 200 also includes a router configured to receive the captured video data and wirelessly retransmit the captured video data, via a modem, to a user computing device in response to a request from the user computing device. The modem and/or router can be contained in a single device. For example, a cellular modem/router device can be used to transmit the data over a 4G cellular network. The router and the modem are housed in an enclosure 203 coupled to the mast 202 and/or the base 205.

The enclosure 203 can be attached or mounted to the mast 202 or the base 205 and can be operatively connected to the camera 204. A high gain, cellular antenna 206 can also be attached or mounted to the mast 202 or the enclosure 203 and can be communicatively coupled to the enclosure 203 and/or the camera 204. A power connector 207 can allow the enclosure 203 to be operatively connected to a power source, such as a generator or a conventional wall socket.

The router can be configured to retransmit the captured video data to the user computing device in response to a request originating at the user computing device and addressed to a data center computing device which is part of the data center and which is external to the remote surveillance apparatus. In this case, the router can be bound to a public internet protocol (IP) address of the data center computing device using a virtual private network (VPN) and the router can comprise the termination point of the VPN. The request from the user computing device can be addressed to the public IP address of the data center computing device and can be directed to the router by a data center firewall or other network component in the data center, using hairpin routing. For example, the data center can be configured to translate the public IP address of the data center computing device to a private IP address associated with the router.

This setup is useful when the modem and/or router of the apparatus have non-public IP addresses. In many cases, cellular routers and/or modems (or combined devices) are issued private IP addresses. This makes it difficult to directly query the device, as the request cannot be address to a valid public IP address. However, by binding the router of the remote surveillance apparatus to a public IP address of a datacenter computing device in the datacenter using a VPN, a user computing device can, indirectly through hairpin routing, request the video data from the remote surveillance apparatus.

The camera 204 can optionally also communicate directly with the network and the data center in wireless manner, such as a cellular 4G network. For example, if the camera is an IP camera, the IP camera can convert the captured images to data packers and transmit them over the network.

Figure 3:
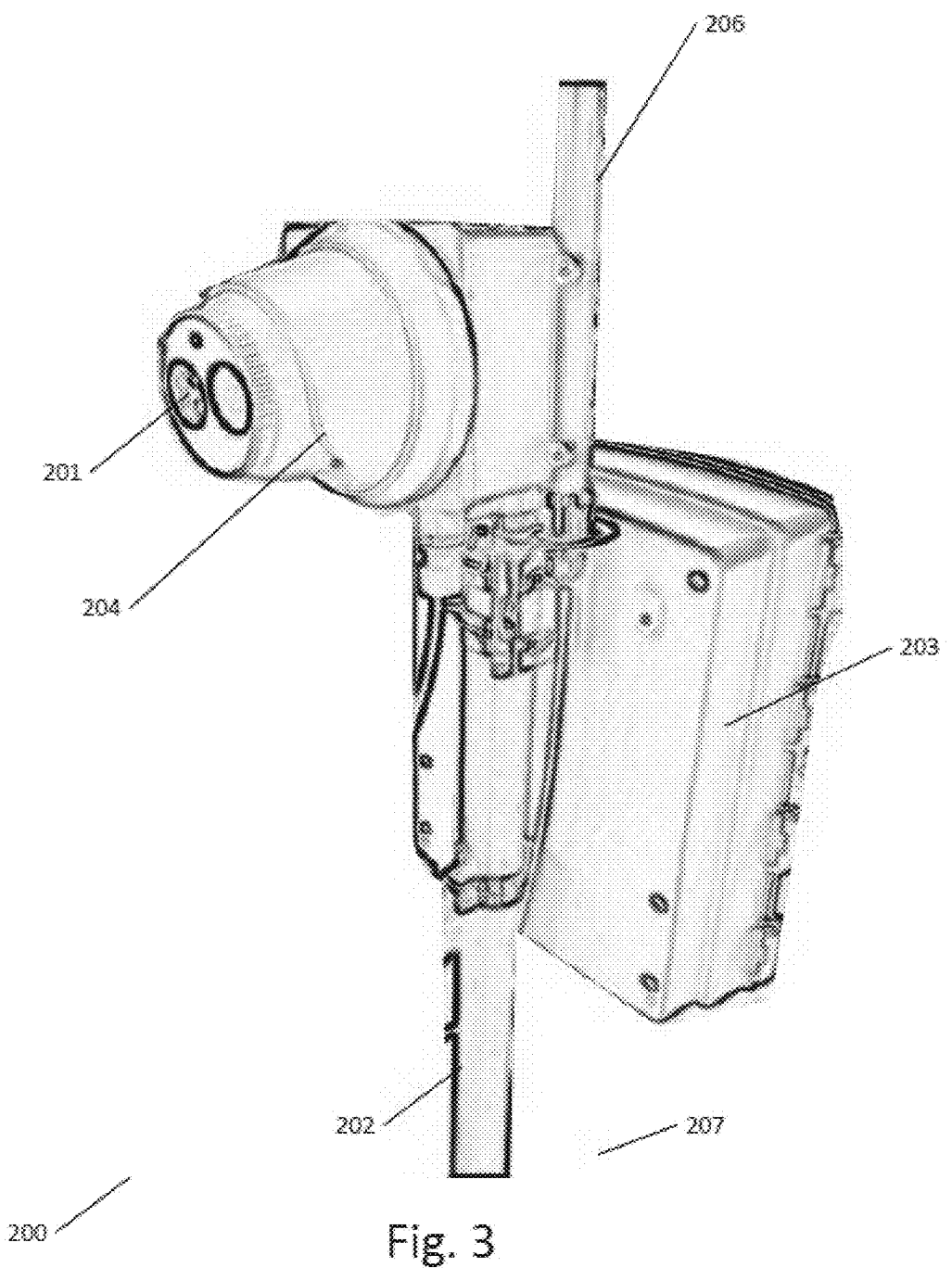
FIG. 3 is an enlarged perspective view of a portion of the remote surveillance apparatus according to an exemplary embodiment.

FIG. 3 is an enlarged perspective view of a portion of the remote surveillance apparatus 200 according to an exemplary embodiment. FIG. 3 illustrates the antenna 206, LED 201, enclosure 203, camera 204, mast 202, and power connector 207 in greater detail.

Figure 4:
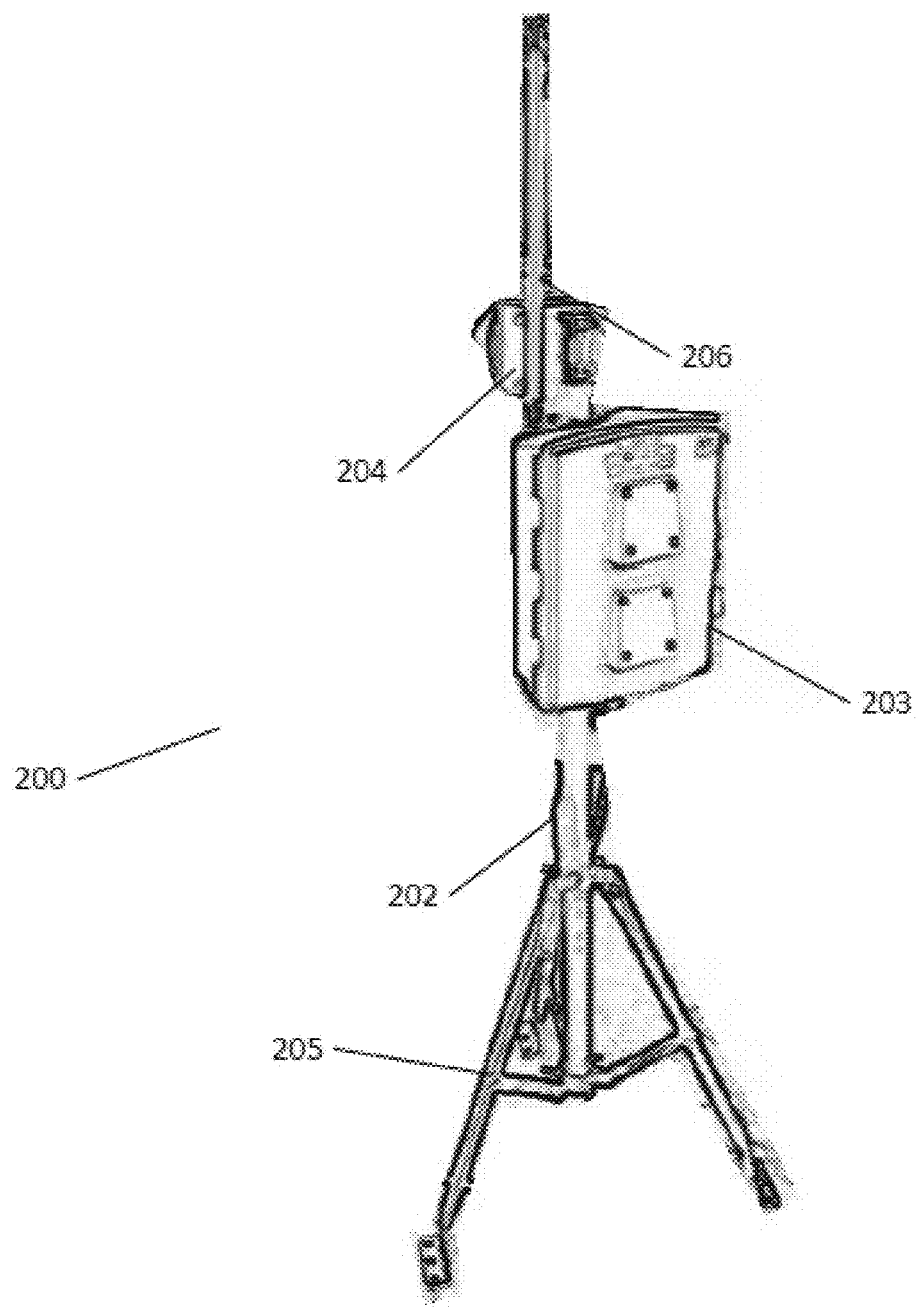
FIG. 4 is a rear perspective view of the remote surveillance apparatus according to an exemplary embodiment.

FIG. 4 is a rear perspective view of the remote surveillance apparatus 200 according to an exemplary embodiment. FIG. 4 illustrates the antenna 206, camera 204, mast 202, enclosure 203, and base 205 from a rear perspective.

Figure 5:
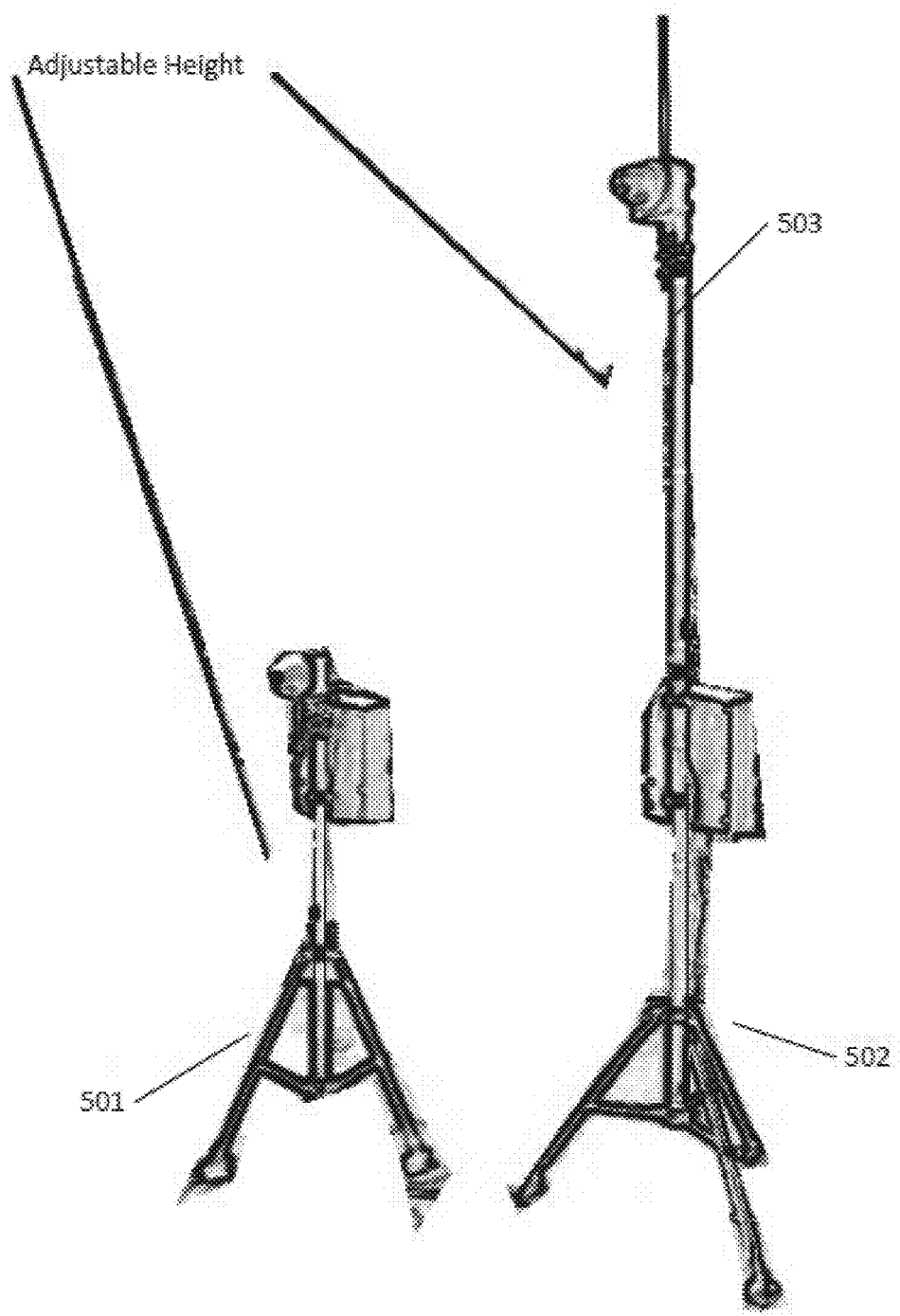
FIG. 5 is perspective view showing the adjustable height of the remote surveillance apparatus according to an exemplary embodiment.

FIG. 5 is perspective view showing the adjustable height of the remote surveillance apparatus according to an exemplary embodiment. FIG. 5 illustrates two remote surveillance apparatuses 501 and 502. As shown in FIG. 5, the mast 503 of apparatus 502 has been extended to a greater height relative to apparatus 501 and the ground.

Figure 6:
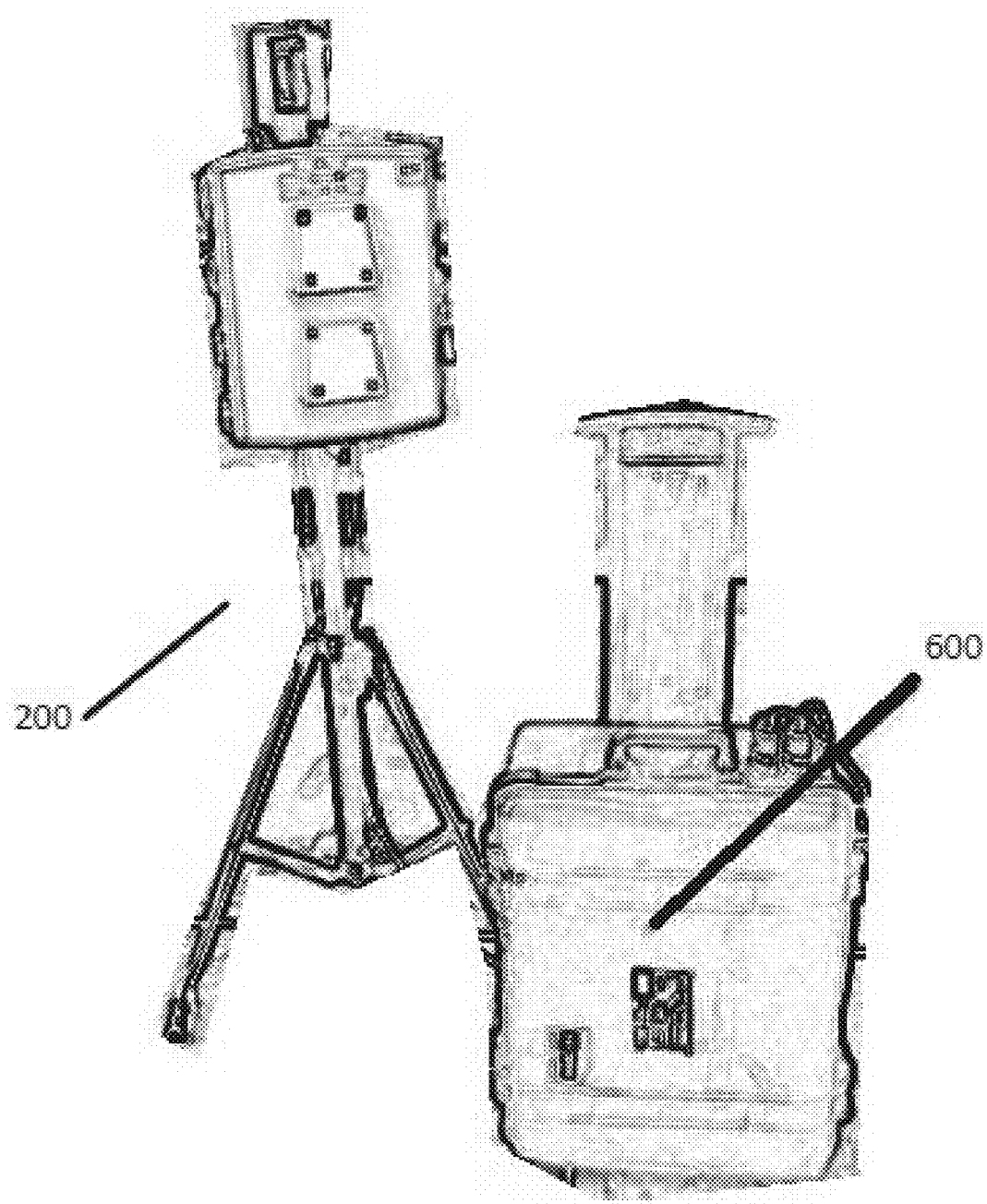
FIG. 6 is a perspective view of a battery backup system according to an exemplary embodiment.

FIG. 6 is a perspective view of a battery backup system 600 according to an exemplary embodiment. The battery backup system 600 can be connected to the enclosure 203 to supply energy in the event of a power failure and/or to enable the apparatus 200 to operate outside the reach of conventional power supplies.

Figure 7:
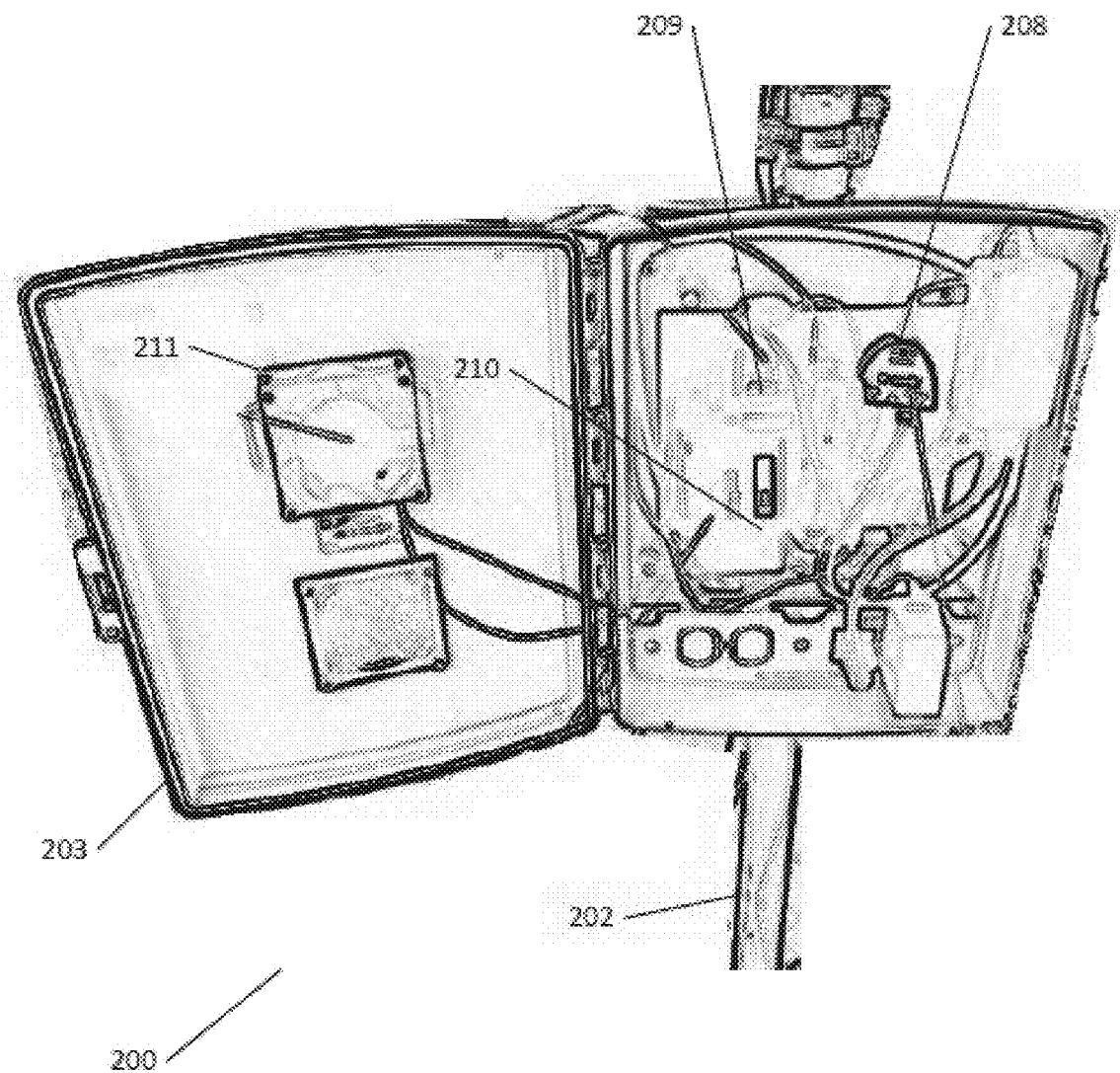
FIG. 7 is a perspective view of an enclosure of the remote surveillance apparatus according to an exemplary embodiment.

FIG. 7 is a perspective view of the enclosure 203 of the remote surveillance apparatus 200 according to an exemplary embodiment. As shown FIG. 7, the enclosure can house a fan 211, a modem 209, a router 210, and/or a power-over-Ethernet injector 208 which can connect with and power the camera 204. Of course, as discussed earlier, the router and/or modem can be contained in a single device such as a modem with router functionality. The fan 211 can be temperature controlled, so as to cool the enclosure 203 and components within the enclosure 203 when a temperature reaches a predetermined point. The modem 209 can be a Universal Serial Bus (USB) cellular modem or a non-USB cellular modem. Additionally, the router 210 can operate on a 3G, 4G, or other network, and/or can form or create a Wi-Fi™ access point.

During initial setup of the apparatus 200, the router 210 can optionally create a Wi-Fi™ access point to enable calibration of the camera on a new site. For example, a user computing device can be used to connect directly to the access point, access the camera through the access point (such as by using the cameras address on the wireless network), and then adjust the tilt, pan, and zoom, or other position of the camera prior to the user departing the site.

As discussed earlier, video feeds, including live or recorded video fees, can be transmitted using the router and modem over an encrypted virtual private network (VPN) link. The camera 204 and/or the video can be remotely accessible by public Internet Protocol (IP), which is made possible by hairpin routing over a VPN tunnel. In this case, the system employs advanced networking to transmit the video(s) (or portions thereof) between the camera 204, the datacenter(s) and the user computing device(s). In particular, the router 210 can be a cellular router with Internet Protocol Security (IPsec) VPN. The router 210 can function as an IPsec VPN termination point, which builds or creates a tunnel from the router 210 to the datacenter(s). The tunnel can encapsulate an entire original IP packet and can add a new packet header. Each datacenter can include a firewall or other network component, which performs network address translation (NAT) and hairpin routing. Accordingly, the captured video data content can then be pulled, instead of pushed, across the VPN.

Figure 8:
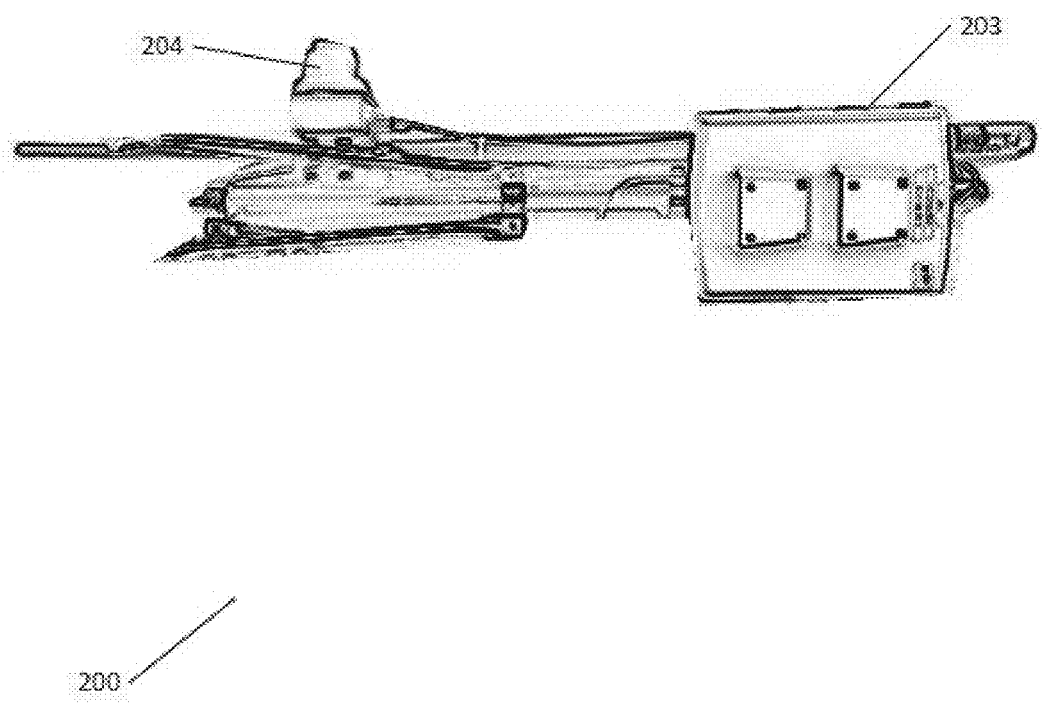
FIG. 8 is a perspective view of the remote surveillance apparatus in a folded configuration according to an exemplary embodiment.

FIG. 8 is a perspective view of the remote surveillance apparatus in a folded configuration according to an exemplary embodiment. As shown in FIG. 8, the apparatus 200 can be folded for easy transport. In a folded configuration, the apparatus 200 can fit within any standard vehicle trunk. The apparatus 200 can be unfolded and set-up to permit operation of the camera 204 in a relatively short period of time, such as several seconds.

Figure 9:
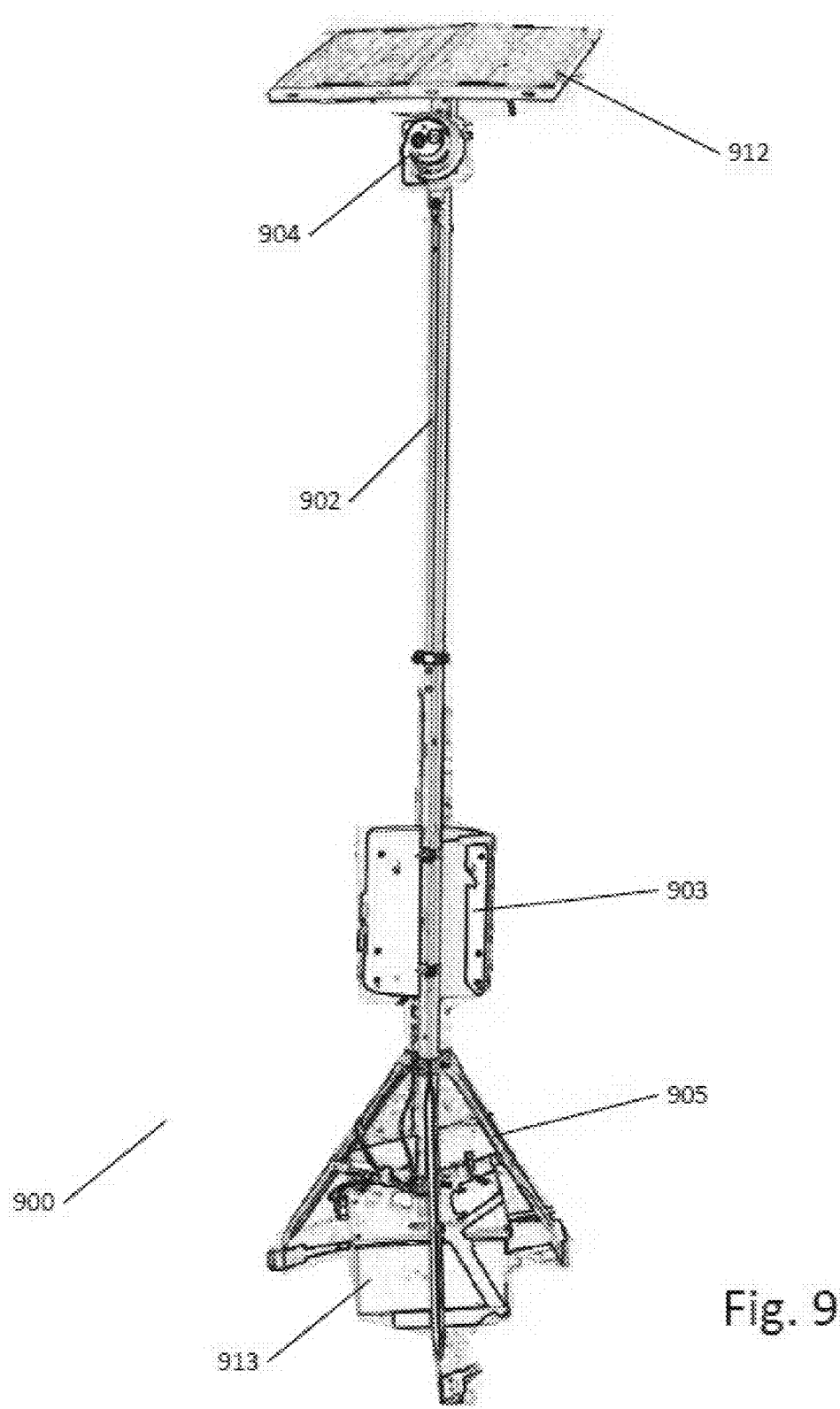
FIG. 9 is a perspective view of the remote surveillance apparatus including a solar panel according to an exemplary embodiment.

FIG. 9 is a perspective view of the remote surveillance apparatus 900 including a solar panel 912 according to an exemplary embodiment. Apparatus 900 can include all of the components in the apparatuses of FIGS. 2-8, such as camera 904, mast 902, a first enclosure 903, and base 905.

Additionally, apparatus 900 includes a solar panel 912 movably coupled to the mast 902 and configured to tilt and swivel and a second enclosure 913 coupled to the base 905. Of course, second enclosure 913 can also be coupled to the mast 902. The second enclosure 913 houses a battery which is electrically coupled to the solar panel and configured to store energy collected by the solar panel 912. The battery is used to power the camera, the modem, and/or the router. Of course the first enclosure 903 and the second enclosure 913 can be combined into a single enclosure which houses all of the components in the first and second enclosures.

As shown in FIG. 9, the first enclosure 903 is coupled to a lower half of the mast 902 and the second enclosure 913 is coupled to the base 905 of the apparatus 900. This positioning allows the apparatus 900 to maintain a center of mass as close to the ground as possible, since the first enclosure 903 and the second enclosure 913 are located within the lower third of the apparatus 900.

Additionally, the solar panel 912 is coupled to the upper half of the mast 902 in order to optimize the quantity of sunlight received by elevating the panel 912 above any obstructions or shadows. Of course, the solar panel 912 height can still be adjusted via the telescopic mast 902.

Figure 10:
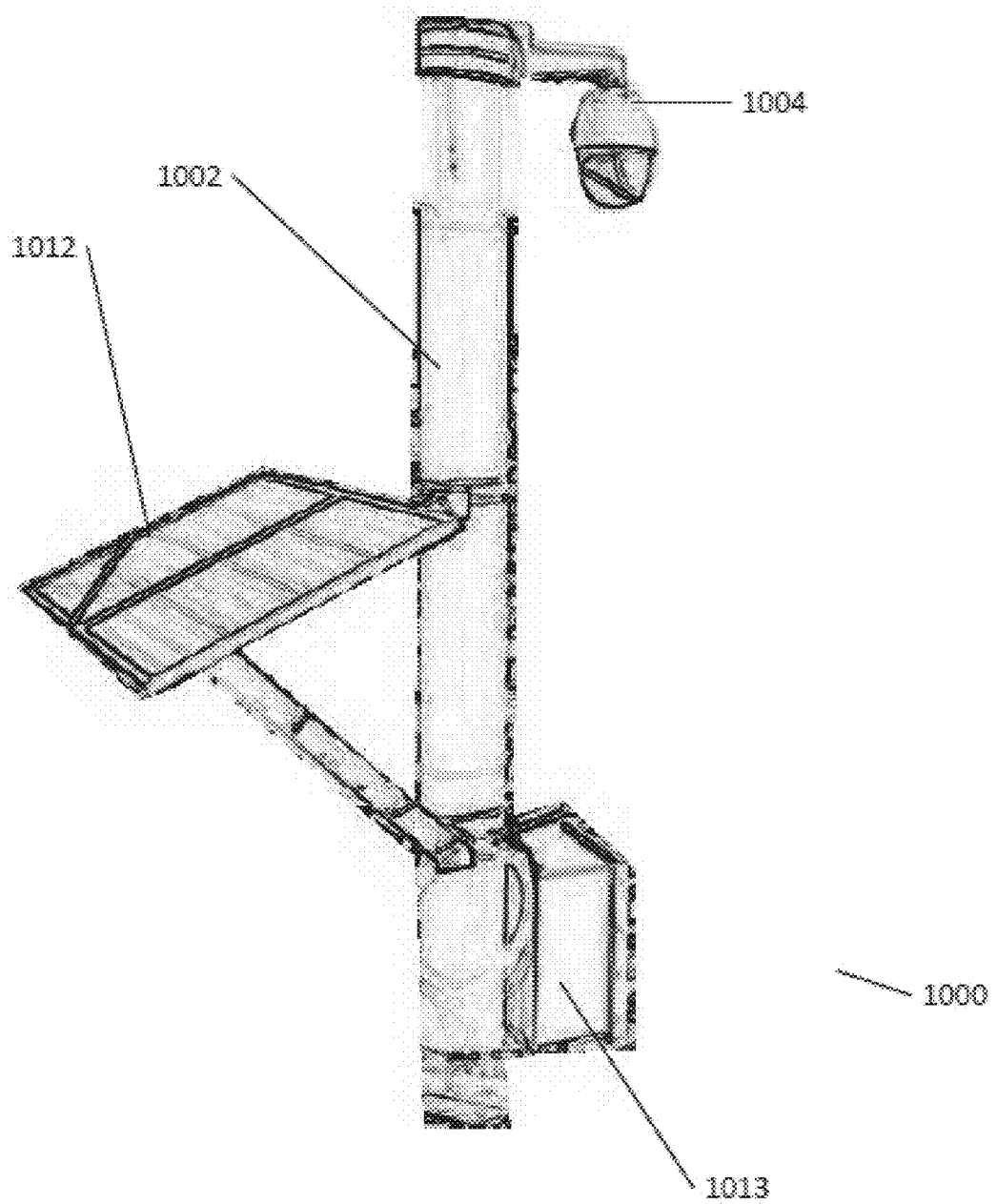
FIG. 10 is a perspective view of the remote surveillance apparatus including a solar panel and having a fixed mast according to an exemplary embodiment.

FIG. 10 is a perspective view of a remote surveillance apparatus 1000 including a solar panel 1012 and having a fixed mast 1002 according to an exemplary embodiment. In this case, the mast 1002 comprises a preexisting pipe structure to which the solar panel 1012, a single enclosure 1013, and a camera 1004 are coupled. Camera 1004 comprises a pan-tilt-zoom (PTZ) camera. Additionally, the single enclosure 1013 includes all the components previously described in the first enclosure and the second enclosure with respect to FIGS. 2-9.

Figure 11:
FIG. 11 illustrates an interface of a user computing device used to access the remote surveillance apparatus according to an exemplary embodiment.

FIG. 11 illustrates a graphical user interface 1100 of a user computing device that displays at least a portion of video captured by the remote surveillance apparatus. As shown in FIG. 11, the camera can be directed toward a construction site, and live video of the site can be accessed or viewed via a user computing device. Due to the weatherproofing and durability of the camera, enclosures, and base, the remote surveillance apparatus is not susceptible to the harsh outdoor environment or rigors of a construction site.

Figure 12:
FIG. 12 illustrates another interface of a user computing device used to access the remote surveillance apparatus according to an exemplary embodiment.

FIG. 12 illustrates another graphical user interface 1200 of a user computing device that displays at least a portion of video captured and transmitted through the system. As shown in FIG. 12, multiple remote surveillance apparatuses and/or a single remote surveillance apparatus having multiple coupled cameras can be positioned around an exterior of a home. Live video of the exterior of the home can be streamed to a display in a dashboard console of a car or other vehicle, for example. Other potential locations for the remote surveillance apparatus include sporting or music events, and commercial businesses.

Figure 13:
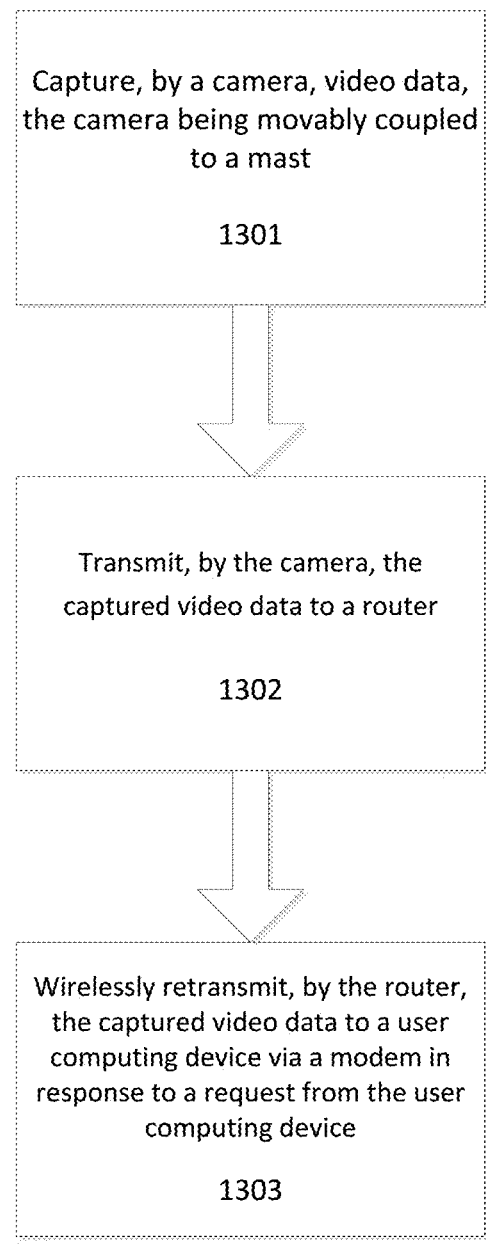
FIG. 13 illustrates a flowchart for operating a remote surveillance apparatus according an exemplary embodiment.

FIG. 13 illustrates a flowchart for operating a remote surveillance apparatus (such as the ones described with reference to FIGS. 1-10) according an exemplary embodiment. At step 1301, video data is captured by a camera, the camera being movably coupled to a mast. At step 1302, the captured video data is transmitted by the camera to a router.

At step 1303 the captured video data is wirelessly retransmitted by the router to a user computing device via a modem in response to a request from the user computing device. The captured video data can be retransmitted to the user computing device in response to a request originating at the user computing device and addressed to a data center computing device in a data center external to the remote surveillance apparatus. As discussed earlier, the router can be bound to a public interne protocol (IP) address of the data center computing device using a virtual private network (VPN) and the router can comprise the termination point of the VPN. In this case, the request can be addressed to the public IP address of the data center computing device and can be directed to the router by the data center using hairpin routing. In order to re-route the request, the data center can be configured to translate the public IP address of the data center computing device to a private IP address associated with the router.

One method of using the system and apparatus disclosed herein includes selecting a location for the remote surveillance apparatus. If the remote surveillance apparatus requires a separate source of electrical power, a location can be chosen in which electrical power is accessible or provided. The remote surveillance apparatus can be placed in the desired location, and anchors attached to the base of the remote surveillance apparatus may be inserted into the ground. After electrical power is supplied to the remote surveillance apparatus, the system can power-up in a short period of time, such as within two minutes. A user computing device can be used to connect to the network created by the router of remote surveillance apparatus to test the view of the camera. An individual can then view video captured by the camera of the remote surveillance apparatus over the Internet, for example.

Historical and/or time-lapse footage can be automatically generated, either at the apparatus itself or a data center. More particularly, live footage can be transmitted over a cellular provider across an encrypted VPN channel to the datacenter. One or more computing devices in the data center can receive incoming video feeds and store the video(s) in real-time and/or time-lapse versions. If and/or when an individual requests a video via a user computing device, the video can be automatically transcoded for the proper bit rate for that user computing device.

Users at the user computing devices can have multiple options for viewing the video data captured by the remote surveillance apparatus. A user can view the video data in real-time as it is captured by the remote surveillance apparatus. A user can also view previous video data in time-lapse manner which is footage from a period of time compressed into a shorter period of time. For example, a ⅙ time lapse video can be created by extracting every $6^{th}$ frame from the raw video footage and combining the extracted frames to construct the time lapse video.

Additionally, a user can view the video data in a hybrid manner which initially displays time-lapse video data up to the current time and then switches to real-time video data when the video data "catches up" to the current time. For example, the remote surveillance apparatus can start recording video data at initial time 7 AM and begin transmitting that video data to the datacenter computing device in the datacenter which is associated with that particular remote surveillance apparatus. The datacenter can track whether a user has viewed the video data footage for that particular day, such as by monitoring requests from the user computing device. When the user initiates a request to view the video data at the datacenter, the datacenter can then transmit time lapse footage from the initial time, 7 AM in this case, up the current time. When video data reaches the current time, then the datacenter can route the request to the camera as discussed earlier and stream the live video data to the user computing device.

The time lapse video footage can be generated from the compiled video data received from the remote surveillance apparatus. For example, after a predetermined period of time (such as every hour), the datacenter can create a new time lapse video of the video data that has been received. If the predetermined period of time is 1 hour, and five hours have passed since the remote surveillance apparatus began recording, then the datacenter will have create five time lapse videos. The time lapse video footage can also be generated at the time of request from the user.

Alternatively, the time lapse video footage can be generated on-the fly, as the video data is received from the remote surveillance apparatus. In this case, the received video stream is used to generate two child streams. The first child stream comprises all of the data in the received video stream and is the non-time lapse footage. The first child stream is essentially just the unaltered received video stream. The second child stream comprises only a fraction of the frames in the incoming video stream. The second child stream can be generated by extracting a frame from the incoming video stream periodically. For example, the second child stream can be generated by extracting every $6^{th}$ frame of video from the incoming video stream for inclusion in the second child stream. The first child stream can then be stored as the pre-recorded non-time lapse footage, and the second child stream can be stored as the time lapse footage of the same period of time. Based on the user's preferences or selections, one or the other or some combination of the non-time lapse and time lapse footage can be transmitted to the user. The advantage of this technique is that no post-processing is required to generate the time lapse video after the incoming video data has been processed.

The apparatus and method disclosed herein have many advantages. Previous image snapshot systems require only require 50 kbps to operate over a cellular network. Video streams require 1,000 kbps or more, which is twenty times more than the previous image snapshot systems. Therefore, video could not be utilized with previous image snapshot systems and a new solution is required. In addition, prior art systems have long set-up times, are unable to transmit live video, and result in a slow or lagging experience.

4G networks, such as those operated by Verizon, AT&T and T-Mobile, have all adopted private IP space instead of public IP space, which effectively eliminates the ability to remotely request resources from a computer device. To solve this problem, the present system employs an IPsec VPN from the remote surveillance apparatus to the datacenter. But such a feature alone only bridges two private components or networks together, and does not allow public accessibility to the remote surveillance apparatus. Hairpin routing with Network Address Translation (NAT) over VPN tunnel are the technologies that can be combined by the present system to provide the functionality described herein. Hairpinning allows packets to come in and out of the same interface. NAT can translate the public to private IP and then VPN can encapsulate the packets with encryption destined to the remote surveillance apparatus. User computing devices in communication with the datacenter are able to remotely initiate a Real Time Streaming Protocol (RTSP) video stream session.

Figure 14:
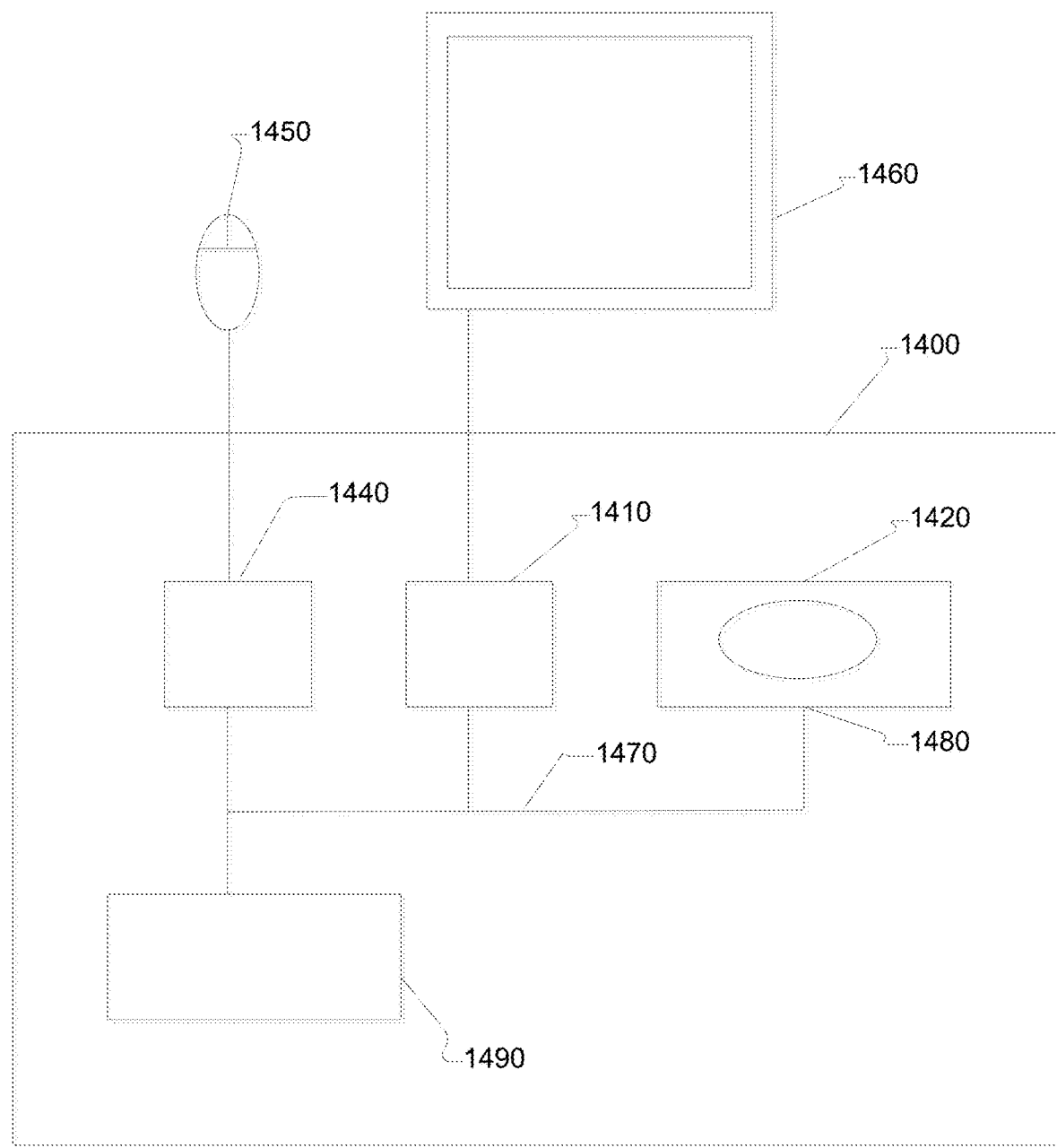
FIG. 14 illustrates an exemplary computing environment that can be used to carry out the method for operating a remote surveillance apparatus.

One or more of the above-described techniques can be implemented in or involve one or more computer systems. FIG. 14 illustrates a generalized example of a computing environment 1400. The computing environment 1400 is not intended to suggest any limitation as to scope of use or functionality of a described embodiment.

With reference to FIG. 14, the computing environment 1400 includes at least one processing unit 1410 and memory 1420. The processing unit 1410 executes computer-executable instructions and may be a real or a virtual processor. In a multi-processing system, multiple processing units execute computer-executable instructions to increase processing power. The memory 1420 may be volatile memory (e.g., registers, cache, RAM), non-volatile memory (e.g., ROM, EEPROM, flash memory, etc.), or some combination of the two. The memory 1420 may store software instructions 1480 for implementing the described techniques when executed by one or more processors. Memory 1420 can be one memory device or multiple memory devices.

A computing environment may have additional features. For example, the computing environment 1400 includes storage 1440, one or more input devices 1450, one or more output devices 1460, and one or more communication connections 1490. An interconnection mechanism 1470, such as a bus, controller, or network interconnects the components of the computing environment 1400. Typically, operating system software or firmware (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information and which can be accessed within the computing environment 1400. The storage 1440 may store instructions for the software 1480.

The input device(s) 1450 may be a touch input device such as a keyboard, mouse, pen, trackball, touch screen, or game controller, a voice input device, a scanning device, a digital camera, remote control, or another device that provides input to the computing environment 1400. The output device(s) 1460 may be a display, television, monitor, printer, speaker, or another device that provides output from the computing environment 1400.

The communication connection(s) 1490 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1400, computer-readable media include memory 1420, storage 1440, communication media, and combinations of any of the above.

Of course, FIG. 14 illustrates computing environment 1400, display device 1460, and input device 1450 as separate devices for ease of identification only. Computing environment 1400, display device 1460, and input device 1450 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1400 may be a set-top box, mobile device, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

It will be appreciated by those skilled in the art that changes could be made to the embodiments described above without departing from the broad inventive concept thereof. For example, the steps or order of operation of the above-described method could be rearranged or occur in a different series, as understood by those skilled in the art. It is understood, therefore, that this disclosure is not limited to the particular embodiments disclosed, but it is intended to cover modifications within the spirit and scope of the present disclosure as defined by the appended claims.

The invention claimed is:

1. A remote surveillance apparatus, comprising,
 a camera movably coupled to a mast and configured to capture video data and transmit the captured video data;
 a router bound to a public internet protocol (IP) address of a data center computing device external to the remote surveillance apparatus using a virtual private network (VPN) and configured to receive the captured video data and wirelessly retransmit the captured video data, via a modem, to a user computing device in response to a request originating at the user computing device that is addressed to the public IP address of the data center computing device and subsequently directed to the router by the data center computing device; and
 an enclosure coupled to the mast and housing the router and the modem.

2. The apparatus of claim 1, wherein the router comprises the termination point of the VPN.

3. The apparatus of claim 2, wherein the request directed to the router by the data center computing device using hairpin routing.

4. The apparatus of claim 3, wherein the data center computing device is configured to translate the public IP address of the data center computing device to a private IP address associated with the router.

5. The apparatus of claim 1, further comprising:
 a solar panel movably coupled to the mast and configured to tilt and swivel;
 a battery electrically coupled to the solar panel and configured to store energy collected by the solar panel and power one or more of the camera, the modem, and the router; and
 a second enclosure coupled to a base and housing the battery.

6. The apparatus of claim 5, wherein the enclosure is coupled to a lower half of the mast and the solar panel is coupled to the upper half of the mast.

7. The apparatus of claim 1, wherein the router and the modem are contained within a single device.

8. The apparatus of claim 1, wherein the camera is configured to tilt, zoom, and pan.

9. The apparatus of claim 1, wherein the enclosure further houses one or more of:
 a fan configured to cool components housed in first enclosure; or
 a Power over Ethernet injector coupled to the camera.

10. A method for operating a remote surveillance apparatus, the method comprising:
 capturing, by a camera, video data, wherein the camera is movably coupled to a mast;
 transmitting, by the camera, the captured video data to a router bound to a public internet protocol (IP) address of a data center computing device external to the remote surveillance apparatus using a virtual private network (VPN); and
 wirelessly retransmitting, by the router, the captured video data to a user computing device via a modem in response to a request originating at the user computing device that is addressed to the public IP address of the data center computing device and subsequently directed to the router by the data center computing device;
 wherein the router and modem are housed in an enclosure coupled to the mast.

11. The method of claim 10, wherein the router comprises the termination point of the VPN.

12. The method of claim 11, wherein the request is directed to the router by the data center computing device using hairpin routing.

13. The method of claim 12, wherein the data center computing device is configured to translate the public IP address of the data center computing device to a private IP address associated with the router.

14. The method of claim 10, wherein one or more of the camera, the modem, or the router are powered by a battery electrically coupled to a solar panel and configured to store energy collected by the solar panel, wherein the solar panel is movably coupled to the mast and configured to tilt and swivel, and wherein the battery is housed in a second enclosure coupled to a base.

15. The method of claim 14, wherein the enclosure is coupled to a lower half of the mast and the solar panel is coupled to the upper half of the mast.

16. The method of claim 14, wherein the router and the modem are contained within a single device.

17. The method of claim 10, wherein the camera is configured to tilt, zoom, and pan.

18. The method of claim 10, wherein the enclosure further houses one or more of:
- a fan configured to cool components housed in the enclosure; or
- a Power over Ethernet injector coupled to the camera.

* * * * *